United States Patent [19]
Carpenter

[11] 3,753,508
[45] Aug. 21, 1973

[54] SKID WHEEL TRACTOR UTILITY BOOM

[76] Inventor: Orval R. Carpenter, 4347 W. 41st St., Tulsa, Okla.

[22] Filed: June 24, 1971

[21] Appl. No.: 156,438

[52] U.S. Cl. .............................. 214/130 R, 214/145
[51] Int. Cl. .......................................... B66c 23/00
[58] Field of Search ................... 214/620, 130, 145, 214/86 A

[56] References Cited
UNITED STATES PATENTS

| 3,512,665 | 5/1970 | Westendorf | 214/145 |
| 3,232,460 | 2/1966 | Rouse | 214/130 R |
| 3,587,887 | 6/1971 | DeCarli | 214/145 |
| 3,587,893 | 6/1971 | Laken | 214/86 A |

Primary Examiner—Gerald M. Forlenza
Assistant Examiner—John Mannix
Attorney—James R. Head et al.

[57] ABSTRACT

A lightweight, hydraulically actuated boom adapted for rapid attachment to, and detachment from, a material-handling power boom. It comprises a base plate adapted to fit and to be latched to a cooperative mounting means on the free end of the power boom. A first arm is fastened to the base plate and carries a hydraulic cylinder. A second arm is hingedly supported from the free end of the first arm, the piston of the hydraulic cylinder being fastened to the second arm.

4 Claims, 3 Drawing Figures

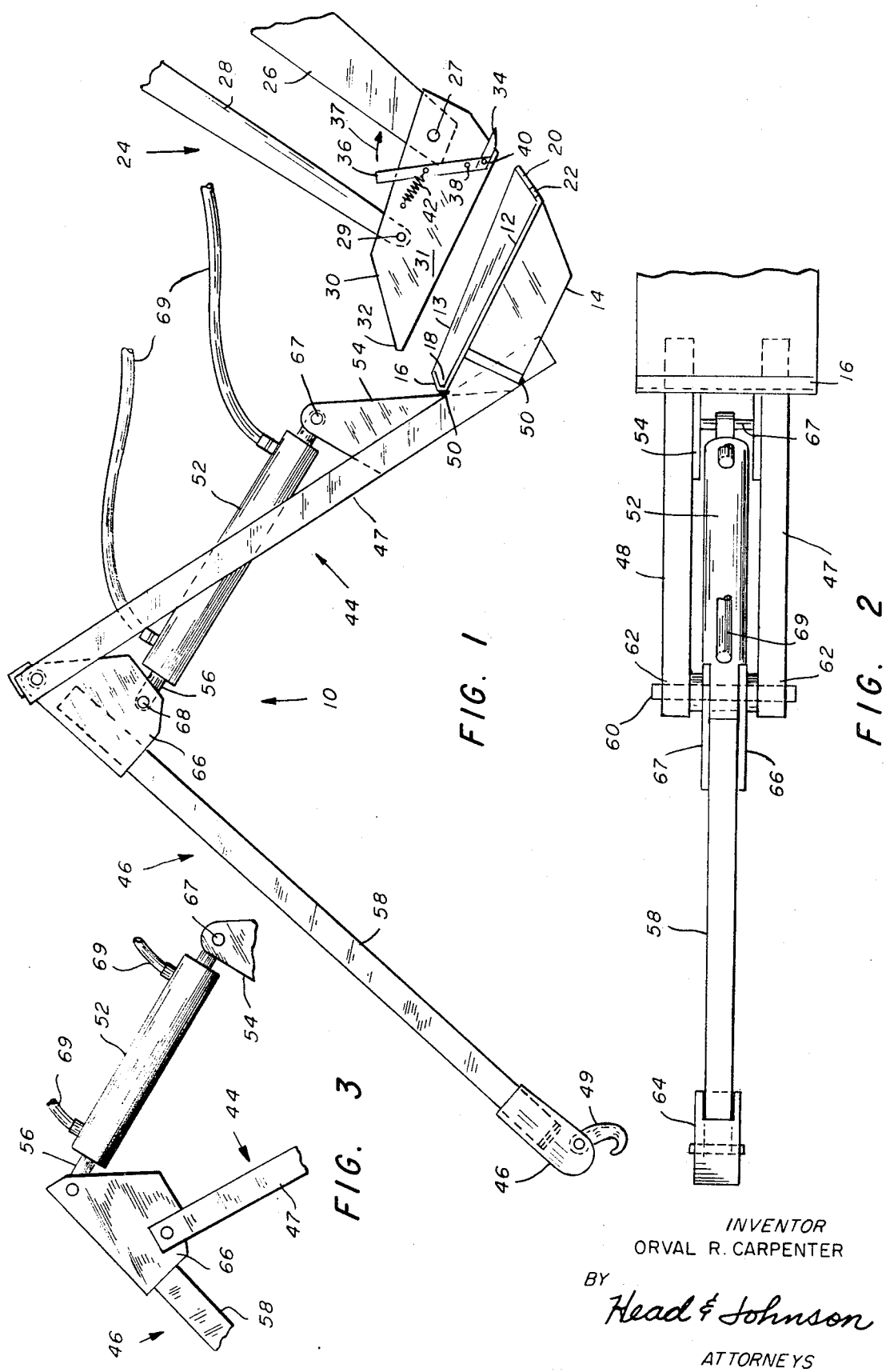
PATENTED AUG 21 1973    3,753,508
INVENTOR
ORVAL R. CARPENTER
BY
Head & Johnson
ATTORNEYS

SKID WHEEL TRACTOR UTILITY BOOM

BACKGROUND OF THE INVENTION

1. Field of the Invention

This invention is in the field of material handling machines, particularly those machines mounted on vehicles which have a work boom supported at one end on the vehicle, and carrying various appliances on the second end. More particularly, this invention is concerned with a lightweight, hydraulically actuated boom adapted to be rapidly and conveniently attached to and detached from the working boom of a small wheeled vehicle.

2. Description of the Prior Art

There are many types of wheeled and tracked vehicles that have powered booms mounted on the vehicles which carry various types of materials handling appliances, such as shovels, scrapers, booms, winches, etc. These are generally large, high-powered machines designed for specific purposes, and generally unsuited for the field of application of this invention.

SUMMARY OF THE INVENTION

This invention is an attachment device in the form of a pair of hinged, lightweight tubular arms. One end of a first arm is fastened to a base plate. A hydraulic cylinder is mounted to the first arm and the operating piston rod to the second arm, so that when the base plate and first arm are fixed, the second arm will serve as a hydraulically operated boom. The base plate is designed to be rapidly attached to a mounting means fastened to the power boom.

This invention is particularly designed to be applied to a small wheeled vehicle, which is known in the trade as the "Bobcat," and is small and light enough to be lifted from floor to floor, and be used in many material handling operations in multiple-storied building construction. While the Bobcat power boom is of sufficient length to be used for conventional purposes on a surface, there are many building activities where a longer boom, sufficiently long to reach from one story to the next in a building, would have great utility for lifting small objects from floor to floor thereby relieving the usually larger boom for ground to floor usage.

It is therefore an object of this invention to provide a simple, inexpensive, rapidly demountable extension boom attachment for a Bobcat type vehicle which can be used for lightweight materials, and which will have a greatly extended lifting range over that of the main boom of the vehicle.

These objects and other objects and an understanding of the details of this invention will be evident from the following description taken in conjunction with the appended drawings, in which:

BRIEF DESCRIPTION OF THE DRAWINGS

FIG. 1 shows a side elevation of the device of this invention.

FIG. 2 shows a plan view of the device.

FIG. 3 shows an alternate arrangement for the hydraulic actuating mechanism.

DESCRIPTION OF THE PREFERRED EMBODIMENT

The device of this invention is generally indicated in the drawings by the numeral 10, and the boom to which it is attached by the numeral 24. The operating end of the power boom 24 generally comprises two arms 26, 28 which hingedly support at pins 27, 29 a mounting means 30, having side walls 31 and a plate having a toe 32 at the front end. At the rear end is a plunger 34 operated by arm 36 pivoted at 38 and engaging the plunger by means of pin 40. A spring 42 keeps arm 36 in the position shown, while a pull in the direction of arrow 37 will cause the plunger to be retracted.

The lightweight boom itself comprises a first arm 44, a second arm 46 and a base plate 12. The base plate has at its front end a flange 16 set at an acute angle 18, adapted to engage and fit the toe 32 of the mounting means 30. At its rear end the base plate 12 has a flange 20 at an obtuse angle, adapted to fit the rear end, or heel, of the mounting means 30. An opening 22 is provided in the flange 20 adapted to receive the plunger 34. Side walls 13 may be provided to guide the mating of the mounting means and the base plate, and to hold them in position until they are locked together by the plunger 34. Thus, when the toe 32 is placed in the angle 18 and the heel is fitted against flange 20, and the plunger 34 past through opening 22, the base plate and mounting means are rigidly attached.

As shown in FIG. 2, the arm 44 comprises two spaced tubular elements 47, 48, which are attached as by welds 50 to the base plate 12 as is well known. At their forward ends the elements 47, 48 rotatably support a shaft 60 in bearings 62. The shaft 60 is fastened to one end of the arm 46, which comprises a tubular element 58. The free end of arm 46 carries in fixture 46 a hook 47, or other material handling means.

Welded to the elements 47, 48 is a plate 54 which supports the base end of a hydraulic cylinder 52 in trunnions 67. The piston rod 56 is similarly rotatably attached to plates 66, 67 welded to tubular element 58. Hydraulic fluid under pressure is supplied through hoses 69.

Thus, when the angle between the arms 44, 46 is widened, and the two arms are almost colinear, the effective reach of the power boom of the Bobcat is almost doubled and lightweight loads can be lifted through a much greater range of elevations. When work requiring the use of the extension boom is completed, the plunger 34 is retracted by moving the lever 36 and the mounting means is removed from the base plate, after which a different appliance can be attached to the mounting means 30.

While the invention has been described with some particularity, it will be clear that from the principles which have been described, one skilled in the art will be able to devise other embodiments all of which are considered to be part of this invention which is not to be limited to the abstract, the description or the drawings, but is to have the scope of the appended claim or claims, when construed to the full equivalents of each element.

What is claimed is:

1. In a material-handling vehicle having a power boom mounted at its inner end onto the bed of said vehicle, the improvement, comprising a lightweight extension boom for rapid attachment to said power boom, comprising:

a. mounting means including a toe plate on the outer end of said power boom;

b. base plate means including an acute-angled flange at the forward edge adapted to engage and lock to said toe plate of said mounting means, an obtuse-angled flange at the rear edge of said base plate, said mounting means adapted to seat at its rear end against said obtuse-angled flange, and including spring operated plunger means on said mounting means and corresponding opening means in said obtuse-angled flange for receiving said plunger means;

c. first arm means attached at its inner end to said base plate means and extending generally in a direction outwardly of said power boom;

d. second arm means hingedly supported at its inner end to the outer end of said first arm means, and including load attachment means at the outer end of said second arm; and e. hydraulic cylinder means attached between said first and second arm means, whereby said second arm can be rotated in a vertical plane relative to said first arm.

2. The extension boom as in claim 1 in which said first arm means comprises a pair of spaced tubular beams attached at their inner end to said base plate and carrying a journaled shaft at their outer ends.

3. The extension boom as in claim 2 in which said second arm comprises a tubular beam attached at its inner end to said shaft, and including hook means at its outer end.

4. The extension boom as in claim 3 including hydraulic means, including a cylinder fastened at its base end to said first arm between said spaced beams, and including piston means attached to said second arm.

* * * * *